(12) United States Patent
Zhao et al.

(10) Patent No.: US 8,570,912 B2
(45) Date of Patent: Oct. 29, 2013

(54) ACCOUNTING METHOD FOR ULTRA MOBILE BROADBAND ACCESS NETWORK

(75) Inventors: Xiaowu Zhao, Shenzhen (CN); Wei Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 744 days.

(21) Appl. No.: 12/678,787

(22) PCT Filed: Dec. 25, 2007

(86) PCT No.: PCT/CN2007/003792
§ 371 (c)(1),
(2), (4) Date: Mar. 18, 2010

(87) PCT Pub. No.: WO2009/036634
PCT Pub. Date: Mar. 26, 2009

(65) Prior Publication Data
US 2010/0215003 A1     Aug. 26, 2010

(30) Foreign Application Priority Data

Sep. 18, 2007 (CN) .......................... 2007 1 0153033

(51) Int. Cl.
*H04B 7/005* (2006.01)
(52) U.S. Cl.
USPC ........................................................ 370/278
(58) Field of Classification Search
None
See application file for complete search history.

(56) References Cited

U.S. PATENT DOCUMENTS

| 5,987,021 A * | 11/1999 | Erickson et al. ............... 370/347 |
| 2003/0214958 A1 | 11/2003 | Madour et al. |
| 2005/0182826 A1* | 8/2005 | Knittel et al. ................. 709/219 |

FOREIGN PATENT DOCUMENTS

| CN | 1794868 A | 6/2006 |
| CN | 101018398 A | 8/2007 |
| KR | 20040102453 A | 12/2004 |

* cited by examiner

*Primary Examiner* — Raj Jain
(74) *Attorney, Agent, or Firm* — Li & Cai Intellectual Property (USA) Office (57) ABSTRACT

An accounting method for session release of an ultra mobile broadband access network is provided. In case of the existence of a preferred Proxy Mobile IP tunnel, when a serving Evolved Base Station, which serves the Access Terminal, sends a session release message to decide to release the Ultra Mobile Broadband session, or receives a session release message from a Session Reference Network Controller, the following steps are performed: S402, the serving Evolved Base Station releasing the resources allocated to the Access Terminal, and sending a corresponding accounting request message concerning the wireless resources occupied by the Access Terminal to an Access Gateway serving the Access Terminal; S404, after receiving the accounting request message, the Access Gateway sending an accounting response message to the serving Evolved Base Station to confirm its reception of the accounting request message.

12 Claims, 8 Drawing Sheets

ACCOUNTING METHOD FOR ULTRA MOBILE BROADBAND ACCESS NETWORK

FIELD OF THE INVENTION

The present invention relates to communication field, in particular to an accounting method for session release of an active access terminal of ultra mobile broadband access network.

BACKGROUND OF THE INVENTION

The Ultra mobile broadband (UMB) technology is a new technology evolved from the CDMA 2000 access technology. Many technologies of the UWB air interface can substantially improve the performance of the CDMA 2000 access technology network and settle an essential base for providing more wireless multimedia service with higher-requirement to users.

Figure 1:
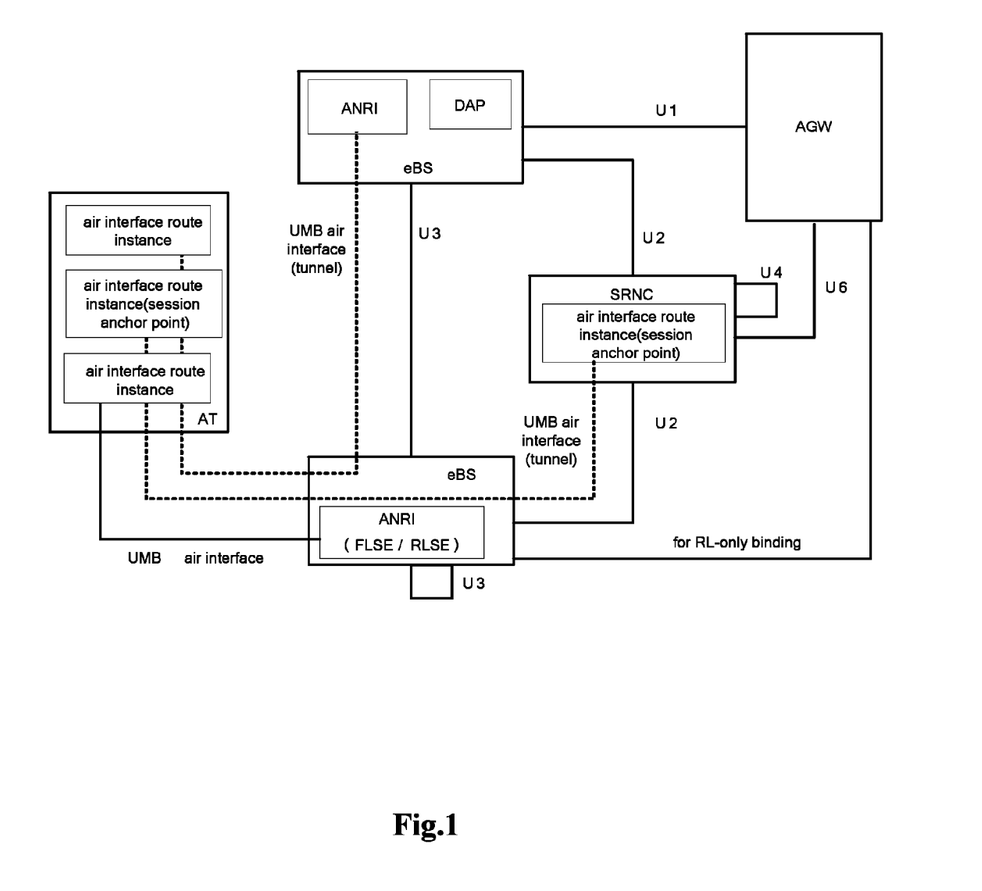
FIG. 1 is a schematic view of the network structure of a UMB access network in the art.

In order to support the UMB air interface technology, related network is also under a new evolvement. FIG. 1 shows the network structure of the access network supporting the UMB technology in the art, wherein, The access gateway (AGW) provides a "point of IP attachment" to the packet data network for access terminals (ATs). Thus, the AGW actually is the first-hop router for the AT.

An evolved base station (eBS) is a logic entity capable of communicating with an AT through a wireless carrier. For each AT being served, the eBS comprises an access network route instance (ANRI). For each AT, the eBS can play none or more of the following roles: forward link serving eBS (FLSE), reverse link serving eBS (RLSE), data attachment point (DAP).

The DAP is the bearer-plane point-of-contact for the AT to the AGW for forward-link data. The AGW sends the data and signaling related to the AT to the DAP. The reverse link data from the AT can either be transmitted to the AGW via the DAP or directly transmitted to the AGW by the RLSE.

The DAP can be relocated to a different eBS during the lifetime of the packet data session based on several factors, such as performance considerations. An example may be to move the DAP when the eBS hosting the DAP is no longer a Route Set member.

A session reference network controller (SRNC) is responsible for maintaining the session reference with the AT. The SRNC is also responsible for supporting idle state management of the AT, and providing paging control functions when the AT is idle.

It is noted that the SRNC can be located in various ways, such as being a standalone entity, or being collocated in an eBS or in an AGW. If the SRNC is collocated into the eBS, both of them can share one ANRI.

In the network structure as shown in FIG. 1, reference point U1 is used to carry the control and bearer information between the eBS and the AGW; reference point U2 is used to carry the control information between the SRNC and the eBS; reference point U3 is used to carry the control and bearer information between two eBSs; reference point U4 is used to carry the control information between SRNCs; and reference point U6 is used to carry the control information between the SRNC and the AGW.

At the same time, accounting function is a basic function required by a wireless communication network, and this function is also required by the access network supporting the UMB. The accounting principle of the UMB network is that the eBS/DAP sends the accounting information of wireless resources to the AGW, and the AGW forwards the information to the Authentication Authorization Accounting (AAA) unit of the core network so as to generate uniform user accounting records for users.

Current access network technology already contains accounting function in some aspects, for example, when a UMB session is established or when an eBS is removed from the route set of a certain AT, the eBS/DAP all sends the related accounting information to the AGW. However, some aspects are ignored in the art. That is to say, there is no accounting information interaction in the following processes or application.

Figure 2:
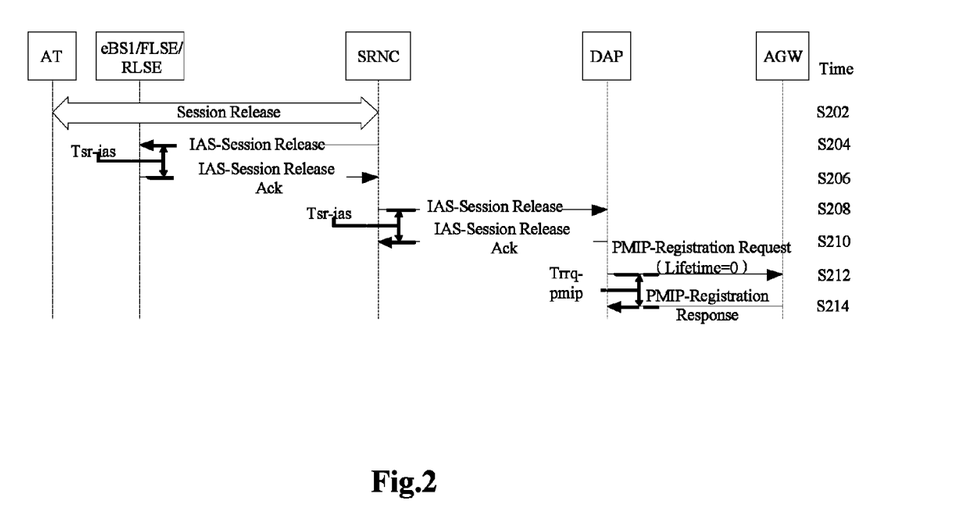
FIG. 2 is a flow chart showing the UMB session release process of an active access terminal in a UMB access network in the art.

As shown in FIG. 2, there is no accounting function for the current UMB session release process initiated by an AT or SRNC. As shown in FIG. 2, the current UMB session release process initiated by an AT or SRNC comprises the following steps:

S202, an AT or the ANRI of the AT initiates a UMB session releasing, wherein it is assumed that the ANRI is the SRNC. After releasing the UMB session, the SRNC sends Inter-ANSI signaling (IAS)—the session release message to all ANRIs and DAP of the route set. The following Steps S204-S206 and S208-S210 can be performed synchronously.

S204, the SRNC sends the IAS-Session Release message to the eBS1/FLSE/RLSE, and starts a timer Tsr-ias at the same time. The message indicates that the SRNC has released the current UMB session, and the eBS1/FLSE/RLSE should deallocate the resources assigned to the AT and purge the UMB session in the eBS1/FLSE/RLSE.

S206, upon receipt of the IAS-Session Release message, the eBS1/FLSE/RLSE sends an IAS-Session Release Ack message to the SRNC. The SRNC stops the timer Tsr-ias.

S208, the SRNC sends the IAS-Session Release message to the DAP and starts a timer Tsr-ias at the same time. The message indicates that the SRNC has released the current UMB session, thus the DAP must release the resources allocated to the AT, eliminate the UMB session of the AT from the DAP, and release the Proxy Mobile IP (PMIP) tunnel between the AGW and DAP.

S210, after receiving the IAS-Session Release message, the DAP sends an IAS-Session Release Ack message to the SRNC which stops timer the Tsr-ias.

S212, after receiving the IAS-Session Release message from the SRNC, the DAP sends a PMIP-Registration Request message to the AGW with a Lifetime timer value of zero to release the PMIP tunnel between the AGW and DAP for the AT. The DAP starts a timer Trrq-pmip.

S214, after receiving the PMIP-Registration Request message from the DAP, the AGW releases tunnel and sends a PMIP-Registration Reply message to the DAP. The DAP stops the timer Trrq-pmip.

Figure 3:
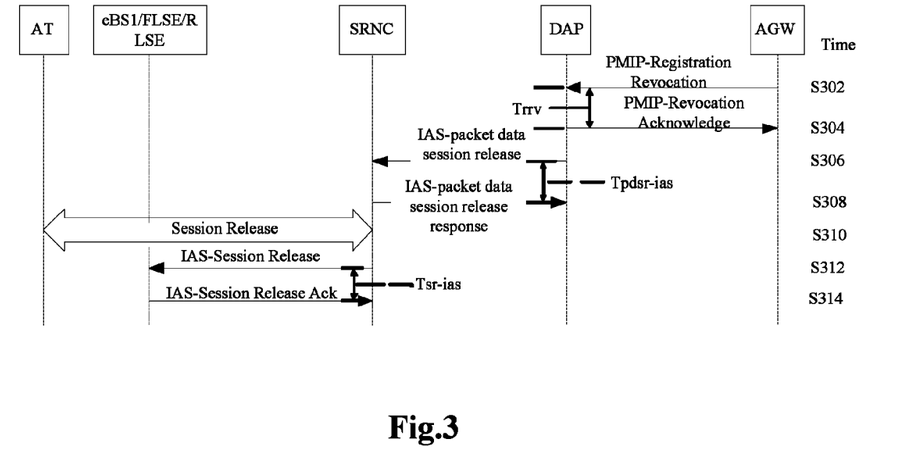
FIG. 3 is a flow chart showing the packet data session release process of an active access terminal in a UMB access network in the art.

As shown in FIG. 3, the current UMB session release process, caused by the UMB packet data session release initiated by the AGW, has also no accounting function. It comprises the following steps:

S302, the AGW sends a PMIP-Registration Revocation message to the DAP and starts a timer Trrv.

S304, after receiving the PMIP-Registration Revocation message, the DAP sends a PMIP-Revocation Acknowledge message to the AGW. The AGW stops the timer Trrv.

S306, it is assumed that the DAP is not in the route set. The DAP sends an IAS-packet data session release message to the SRNC and starts a timer Tpdsr-ias. The IAS-packet data release message is used to indicate that the packet data session has been released.

S308, after receiving the IAS-packet data session release message, the SRNC sends an IAS-packet data release response message to the DAP. The DAP stops the timer Tpdsr-ias.

S310, after receiving the IAS-packet data session release message, the SRNC initiates the release of the UMB session. The SRNC shall send the IAS-session release message to all ANRIs in the route set and DAP.

S312, the SRNC sends the IAS-session release message to the eBS1/FLSE/RLSE and starts a timer Tsr-ias. The message indicates that the SRNC has released the current UMB session and the eBS1/FLSE/RLSE should release the resources allocated to the AT and eliminate the UMB session of the AT from the eBS1/FLSE/RLSE.

S314, after receiving the IAS-Session Release message, the eBS1/FLSE/RLSE sends an IAS-Session Release Ack message to the SRNC. The SRNC stops the timer Tsr-ias.

Based on the above description, above-mentioned flows do not transfer related accounting information to the AGW. In addition, there is the case in which the active access terminal has multiple proxy mobile IP tunnels, and no solution is provided in the art to solve the accounting process upon releasing multiple proxy mobile IP tunnels. Thus, these flows are short of function supporting accounting, which is a severe limitation to the real network and brings substantial impairment to the benefits of operators.

SUMMARY OF THE INVENTION

In view of one or more problems mentioned above, the present invention provides an accounting method for ultra mobile broadband access network.

There is an accounting method for UMB access network according to embodiments of the present invention aiming at the case of the existence of a preferred PMIP tunnel, when a serving eBS, which serves an AT, sends a session release message to decide to release the UMB session, or receives a session releasing message from a SRNC for releasing UMB session, the following steps are performed: S402, the serving eBS releasing the resources allocated to the AT, and sending an corresponding accounting request (stop) message concerning the wireless resources occupied by the AT to an AGW serving the AT; S404, after receiving the accounting request message, the AGW sending an accounting response message to the serving eBS to confirm its reception of the accounting request message.

Wherein, while sending the accounting request message to the AGW, the eBS starts a timer of a predefined time length so as to resend accounting request message to the AGW in case that no accounting response message has not been received within the specified time length.

Wherein, after receiving a packet data session release message from a data attachment point, the SRNC sends the session release message to the eBS and initiates a UMB session release, so as to start an accounting flow.

Wherein, the accounting request message contains accounting stop information, an air interface record, and a connection closing indication.

There is another accounting method for UMB access network according to embodiments of the present invention aiming at the case of the existence of multiple PMIP tunnels, when the serving eBS, which serves an AT, sends a session release message to decide to release a UMB session, or receives a session release message from the SRNC for releasing UMB session, the following steps are performed: S702, the serving eBS releasing the resources allocated to the AT, and sending an corresponding accounting request (stop) message concerning the wireless resources occupied by the AT to an AGW serving the AT; S704, after receiving the accounting request message, the AGW sending an accounting response message to the serving eBS to confirm is reception of the accounting request message is received by itself. Wherein, if there is an Air Link Record created for the AT in the non-serving eBS or DAP, the non-serving eBS sends an accounting request message to the AGW, and after receiving the accounting request message from the non-serving eBS, the AGW sends an accounting response message to the non-serving eBS so as to confirm its reception of the accounting request message from the non-service eBS.

Wherein, the serving eBS and non-serving eBS start timers of a predefined time length while sending the accounting request message to the AGW, so as to resend the accounting request message to the AGW in case of the accounting request message has not being received in the predefined time length.

Wherein, upon receiving the packet data session release message from the data attachment point, the SRNC sends the session release message to the serving eBS and initiates the UMB session releasing, thus starts an accounting flow.

Wherein, the accounting request message sent by the non-serving eBS contains accounting stop information, an air interface record and a connection closing indication.

The present invention improves the accounting function of an access network supporting UMB technology so as to improve the accounting performance of the entire network which is critical to both operators and users.

BRIEF DESCRIPTION OF THE DRAWINGS

Drawings herein are provided for a further understanding of the present invention and form a part of the specification, which are used to explain the present invention with the embodiments of the present invention rather than to unduly limit the present invention, wherein.

DETAILED DESCRIPTION OF EMBODIMENTS

The concrete embodiments of the present invention will be described in detail in connection with the drawings.

Figure 4:
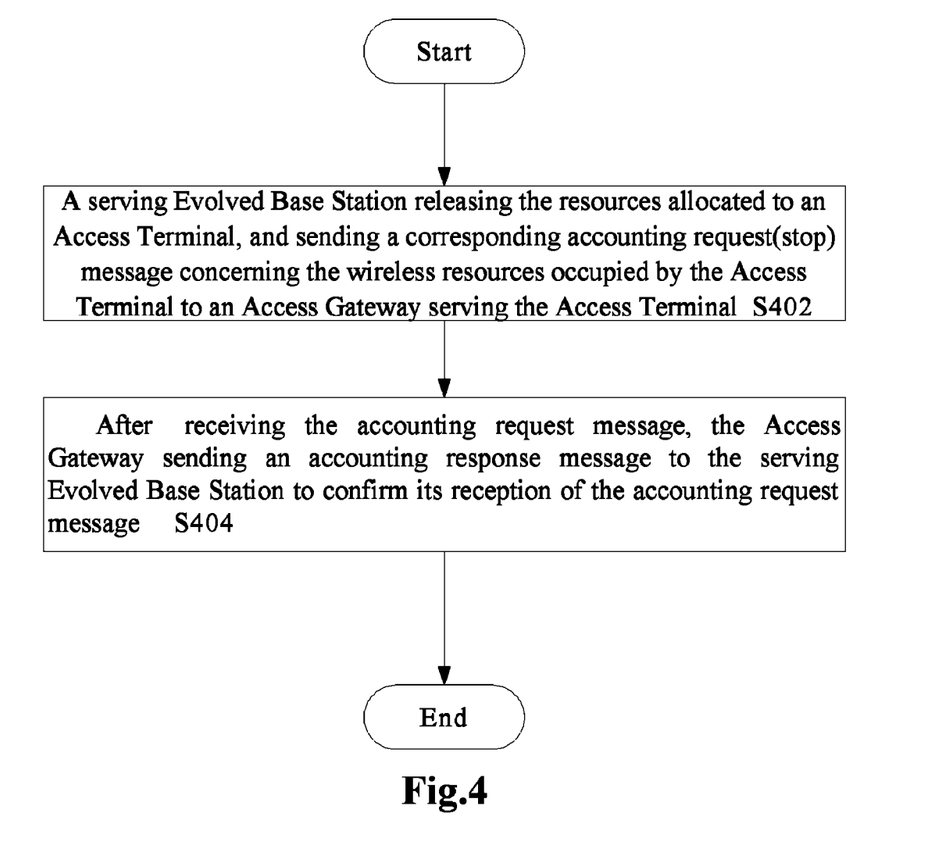
FIG. 4 is a schematic flow chart of the accounting method for the UMB access network in case of the existence of a preferred PMIP tunnel according to an embodiment of the present invention.

Referring to FIG. 4, the following description explains the accounting method for a UMB access network in the case of the existence of a preferred PMIP tunnel according to an embodiment of the present invention. As shown in FIG. 4, when a serving eBS, which serves an AT, sends a session release message to decide to release a UMB session, or receives a session release message from the SRNC for releasing a UMB session, the following steps are performed: S402, the serving eBS releases the resources allocated to the AT, and sends an accounting request (stop) message to an AGW serving the AT; and S404, after receiving the accounting request message, the AGW sends an accounting response message to the serving eBS to confirm its reception of the accounting request message.

Wherein, the serving eBS starts a timer of a predefined time length while sending the accounting stop message to the AGW, so as to resend the accounting request message to the AGW in case of no accounting response message being received in the predefined time length.

Wherein, upon receiving a packet data session release message from a DAP, the SRNC sends a session release message to the serving eBS and initiates the UMB session releasing, so as to start an accounting flow. Wherein, the accounting request message contains accounting stop information and an air interface record.

Figure 5:
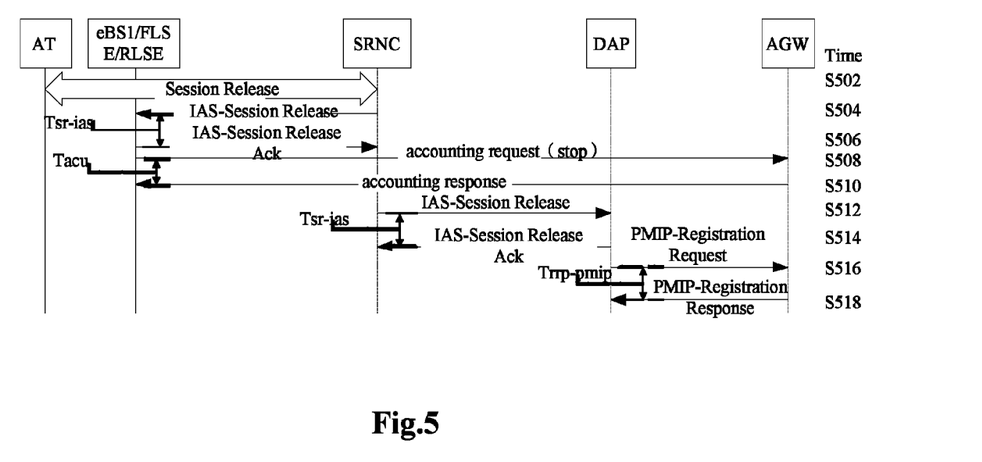
FIG. 5 is a detailed flow chart showing the UMB session release process of an active access terminal in a UMB access network, which includes the process of FIG. 4.

Referring to FIG. 5, the following description explains the UMB session release process of an active AT in a UMB access network, which includes the process of FIG. 4. Wherein, there is a preferred PMIP tunnel between the DAP and the AGW. In this process, a step that the eBS1 sends an "accounting request" message to the AGW which returns an "accounting response" message after receiving the "accounting request" message is newly introduced, and a timer Tacu is defined. As shown in FIG. 5, the process comprises the following steps:

S502, the AT or the ANRI of the AT initiates the UMB session release, wherein it is assumed that this ANRI is the SRNC. After releasing the UMB session, the SRNC sends an IAS-Session Release message to all ANRIs and DAP in the route set. The following Steps S504-S506 and S512-S514 can be performed synchronously.

S504, the SRNC sends the IAS-Session Release message to the eBS1/FLSE/RLSE, and starts a timer Tsr-ias at the same time. The message indicates that the SRNC has released the current UMB session, thus the eBS1/FLSE/RLSE must release the resources allocated to the AT and purge the UMB session of the AT from the eBS1/FLSE/RLSE.

S506, after receiving the IAS-Session Release message, the eBS1/FLSE/RLSE sends an IAS-Session Release Ack message to the SRNC. The SRNC stops the timer Tsr-ias.

S508, the eBS1 sends an accounting request (stop) message to the AGW, which contains air interface record 1 a, and at the same time the eBS1 starts a timer Tacu. This step can be performed at any time after Step S504.

S510, the AGW sends an accounting response message to the eBS1. The eBS1 stops the timer Tacu after receiving the accounting response message.

S512, the SRNC sends the IAS-Session Release message to the DAP and starts a timer Tsr-ias at the same time. The IAS-Session Release message is used to indicate that the SRNC has released the current UMB session, thus the DAP must release the resources allocated to the AT, eliminate the UMB session of the AT from the DAP, and release the PMIP tunnel between the AGW and DAP.

S514, after receiving the IAS-Session Release message, the DAP sends an IAS-Session Release response message to the SRNC. The SRNC stops the timer Tsr-ias.

S516, after receiving the IAS-Session Release message from the SRNC, the DAP sends a PMIP-registration request message, in which the value of a lifetime field is 0, to the AGW, so as to release the PIMIP tunnel of the AT between the AGW and DAP. The DAP starts a timer Trrq-pmip.

S518, after receiving the PMIP-registration request message from the DAP, the AGW releases tunnel and sends an PMIP-registration request response message to the DAP. The DAP stops the timer Trrq-pmip.

Figure 6:
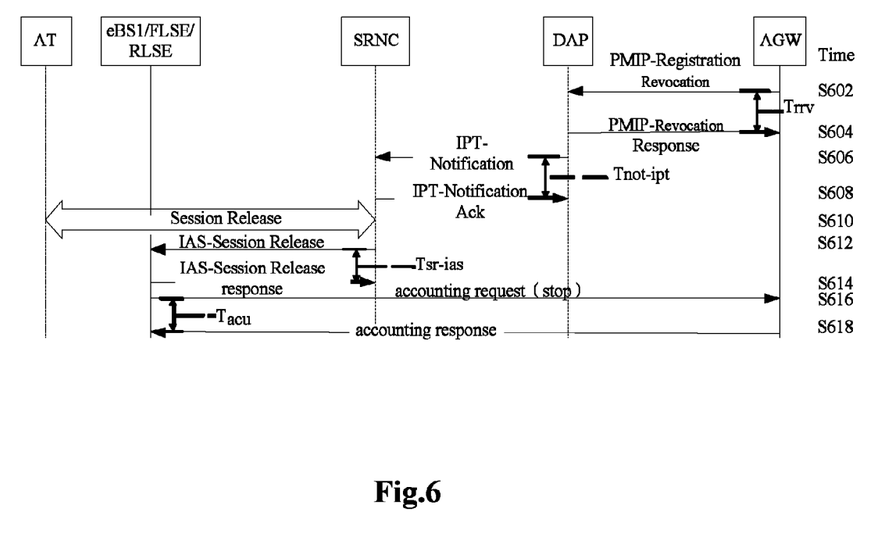
FIG. 6 is a detailed flow chart showing the packet data session release process of an active access terminal in a UMB access network, which includes the process of FIG. 4.

Referring to FIG. 6, the following description explains the UMB session release process caused by the packet data session release for an active AT in the UMB access network, which includes the process shown in FIG. 4 and an accounting flow. Wherein, there is a preferred PMIP tunnel between the DAP and the AGW. In this process, a step that the eBS1 sends an "accounting request (stop)" message to the AGW which returns an "accounting response" message after receiving the "accounting request (stop)" message is introduced, and timer is defined for the two messages. As shown in FIG. 6, the process comprises the following steps:

S602, the AGW sends a PMIP-registration Revocation message to the DAP and starts a timer Trrv.

S604, after receiving the PMIP-registration Revocation message, the DAP sends a PMIP-Revocation Acknowledge message to the AGW. The AGW stops the timer Trrv.

S606, it is assumed that the DAP is not in the route set. The DAP sends an IPT-notification message to the SRNC so as to indicate that the packet data session has been released and starts a timer Tnot-ipt.

S608, after receiving the IAS-notification message, the SRNC sends an IPT-notification Ack message to the DAP. The DAP stops the timer Tnot-ipt.

S610, after receiving the IPT-notification message, the SRNC initiates the release of the UMB session. After releasing the UMB session of the AT, the SRNC sends an IAS-Session Release message to all ANRI in the route set.

S612, the SRNC sends the IAS-Session Release message to the eBS1/FLSE/RLSE and starts a timer Tsr-ias at the same time. The IAS-Session Release message is used to indicate that the SRNC has released the current UMB session, thus the eBS1/FLSE/RLSE must release the resources allocated to the AT and eliminate the UMB session of the AT from the eBS1/FLSE/RLSE.

S614, after receiving the IAS-Session Release message, the eBS1/FLSE/RLSE sends an IAS-Session Release response message to the SRNC. The SRNC stops the timer Tsr-ias.

S616, the eBS1 sends an accounting request (stop) message to the AGW, and starts a timer Tacu at the same time. This step can be performed at any time after Step S604.

S618, the AGW sends an accounting response message to the eBS1. The eBS1 stops the timer Tacu after receiving the message.

Figure 7:
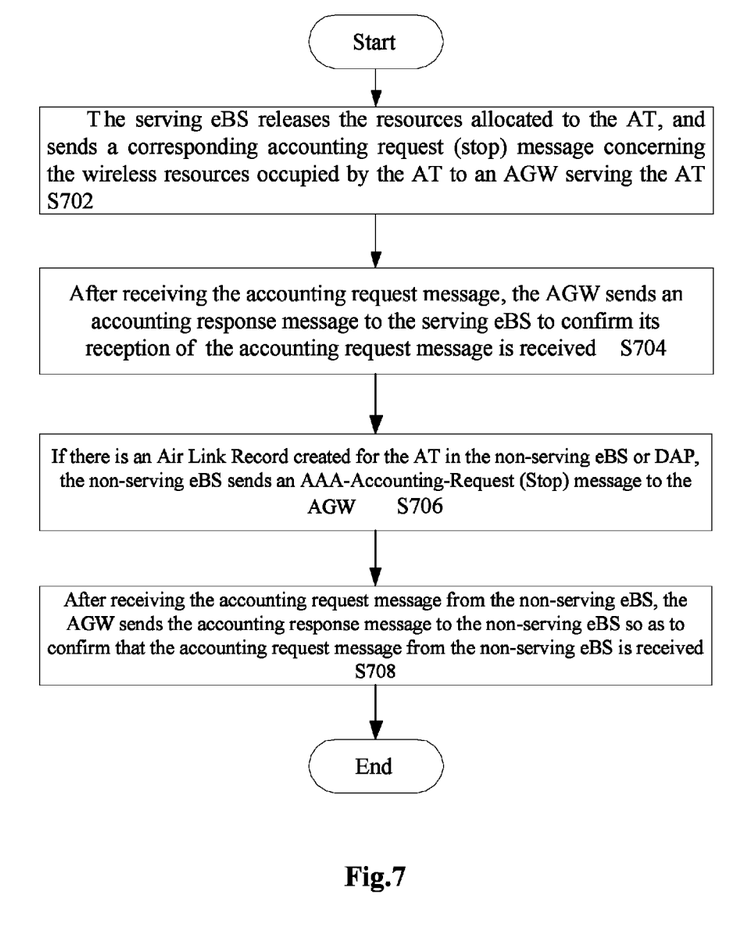
FIG. 7 is a schematic flow chart showing the accounting method for a UMB access network in case of the existence of multiple PMIP tunnels according to an embodiment of the present invention.

Referring to FIG. 7, the following description explains the accounting method for a UMB access network according to an embodiment of the present invention, which aims at the case of the existence of multiple PMIP tunnels. As shown in FIG. 7, when a serving eBS, which serves the AT, sends a session release message to decide to release the UMB session, or sends a session release message to the route set members of the AT and the DAP, or receives a session release message from the SRNC to release the UMB session, the accounting method comprises the following steps: S702, the serving eBS releases the resources allocated to the AT, and sends an accounting request (stop) message concerning the wireless resources occupied by the AT to an AGW serving the AT; S704, after receiving the accounting request message, the AGW sends an accounting response message to the serving eBS to confirm its reception of the accounting request message; S706, If there is an Air Link Record created for the AT in the non-serving eBS or DAP, the non-serving eBS sends an AAA-Accounting-Request (Stop) message to the AGW; and S708, after receiving the accounting request message from the non-serving eBS, the AGW sends an accounting response message to the non-serving eBS so as to confirm that the accounting request message from the non-serving eBS is received. Wherein, Steps S702-S704 and Steps S706-S708 can be performed at the same time.

Wherein, the serving eBS and the non-serving eBS start timers of a predefined time length while sending the accounting request message to the AGW, so as to resend the accounting request message to the AGW in case of no accounting response message being received in the predefined time length.

Wherein, upon receiving the packet data session release message from the DAP, the SRNC sends the session release message to the serving eBS, initiates the UMB session releasing, and thus starts the accounting flow.

Figure 8:
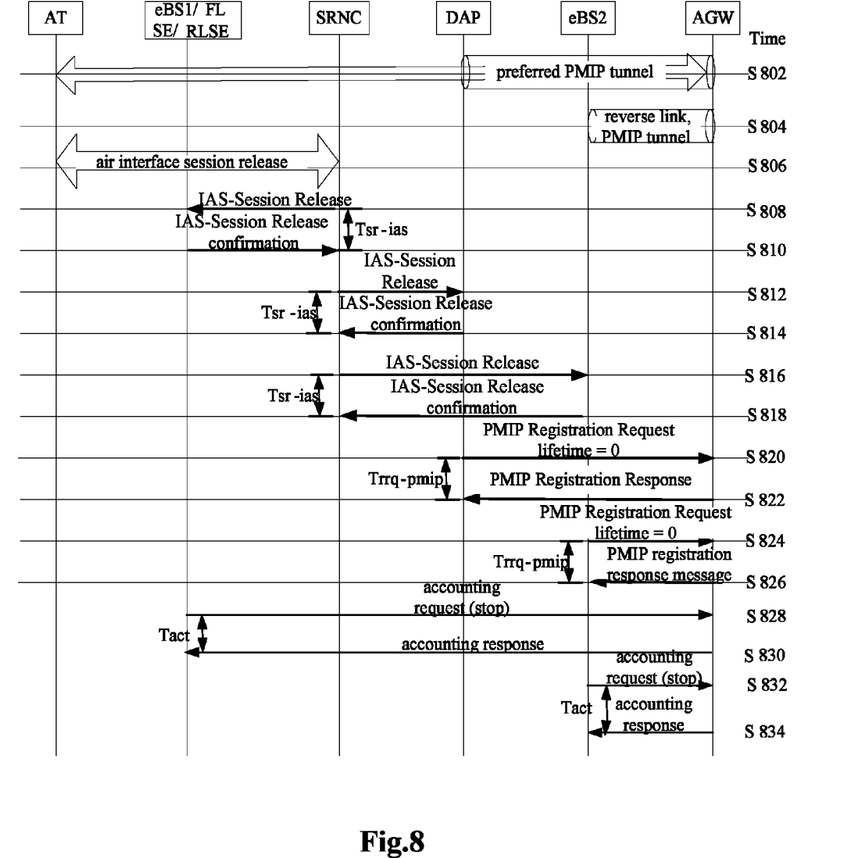
FIG. 8 is a detailed flow chart showing the UMB session release process of multiple PMIP Tunnels of an active access terminal in a UMB access network, which includes the process of FIG. 4.

Referring to FIG. 8, the following description explains the session release process for the case of existing multiple PMIP tunnels, which includes the process shown in FIG. 7. Wherein, apart from the primary PMIP tunnel between the DAP and the AGW, there is a reverse PMIP tunnel between eBS2 and the AGW, where it is assumed that eBS1 is a front reverse serving eBS. As shown in FIG. 8, the session release process comprises the following steps:

S802, there is a primary PMIP tunnel between the DAP and the AGW, and data is being transmitted between the AT and the AGW.

S804, between eBS2 and the AGW is a reverse PMIP tunnel for reverse data transmission.

S806, air interface session release is performed between the AT and the SRNC.

(Following Steps S808-S810, S812-S814, S816-S818 can be performed at the same time.) S808, the SRNC sends an IAS-Session Release message to eBS1, and sets a timer Tsr-ias to wait for a response message from eBS1.

S810, eBS1 returns an IAS-Session Release confirmation message to the SRNC, and the SRNC resets the timer Tsr-ias after receiving the confirmation message.

S812, the SRNC sends the IAS-Session Release message to the DAP and sets a timer Tsr-ias to wait for a response message from the DAP.

S814, the DAP returns an IAS-Session Release confirmation message to the SRNC, and the SRNC resets the timer Tsr-ias after receiving the confirmation message.

S816, the SRNC sends the IAS-Session Release message to eBS2 and sets a timer Tsr-ias to wait for a response message from eBS2.

S818, eBS2 returns an IAS-Session Release confirmation message to the SRNC, and the SRNC resets the timer Tsr-ias after receiving the confirmation message.

S820, after receiving the IAS-Session Release message, the DAP sends a PMIP registration request message to the AGW and sets a timer Trrq-pmip to wait for a response message from the AGW, wherein, the PMIP registration request message has a lifetime of 0 to indicate that the PMIP tunnel shall be released.

S822, after receiving the PMIP registration request message, the AGW finds the lifetime being 0, deletes the PMIP tunnel, and returns a PMIP registration response message to the DAP, and the DAP resets the timer Trrq-pmip after receiving the response message.

S824, after receiving the IAS-Session Release message, eBS2 sends a PMIP registration request message to the AGW and sets a timer Trrq-pmip to wait for a response message from the AGW, wherein, the PMIP registration request message has a lifetime of 0 to indicate that the PMIP tunnel shall be released. This step can be performed immediately after step S816.

S826, after receiving the PMIP-Registration Request message, the AGW finds the lifetime being 0, deletes the PMIP tunnel, and returns a PMIP Registration Response message to eBS2, and eBS2 resets the timer Trrq-pmip after receiving the response message.

S828, the eBS1/FLSE/RLSE sends an accounting request (stop) message to the AGW and starts a timer Tact. This step can be performed at any time after Step S808.

S830, the AGW sends an accounting response message to the eBS1/FLSE/RLSE which stops the timer Tact after receiving the response message.

S832, if an air link record has been previously created for the AT, eBS2 sends an accounting request (stop) message to the AGW and starts a timer Tact. This step can be performed at any time after Step S816.

S834, the AGW sends an accounting response message to eBS2, and eBS2 stops the timer Tact after receiving the response message.

However, there is no timer Tacu (the timer can be titled with another name) in the art. It is considered that the accounting message is very important, thus it shall be ensured that the AGW can accurately receive the accounting message from the eBS. Therefore, the eBS should start a timer Tacu after sending an accounting request message, wherein the time length of the timer can be configured flexibly. If no accounting response message is received from the AGW before the timer expires, the eBS resends the accounting request message. The eBS will quit sending accounting information when still no accounting response message is received from the AGW after repeating the process several times (the number of times of the repetition can be pre-configured). The timer can be used not only in the flow of the present invention but also in any other flow relating to two pieces of accounting information.

Based on the above description, aiming at the fact that there is no accounting process or information relating to the UMB flow in the current UMB access network technology, the present invention puts forward an accounting information interactive process for the UMB session release and packet data session release flow, so as to improve the above technology flow and the accounting function in the UMB access network, thus it is of importance in actual network.

Above description is to illustrate embodiments of the present invention but not to limit the present invention. Various alterations and changes to the present invention are apparent to those skilled in the art. The scope defined in the claims shall comprise any modification, equivalent substitution and improvement within the spirit and principle of the present invention.

We claim:

1. An accounting method for ultra mobile broadband (UMB) access network, comprising following steps:
 a serving Evolved Base Station (eBS), which serves an Assess Terminal (AT), releasing resources allocated to the AT when the serving eBS sends a session release message to release a UMB session, or receives a session release message from a Session Reference Network Controller (SRNC) to release a UMB session, and when there exists a previously selected Proxy Mobile IP (PMIP) tunnel;

the serving eBS sending an accounting request message concerning wireless resources occupied by the AT to an Access Gateway (AGW) serving the AT; and after receiving the accounting request message, the AGW sending an accounting response message to the serving eBS to confirm its reception of the accounting request message.

2. The accounting method according to claim 1, wherein the serving eBS starts a timer of a predefined time length while sending the accounting request message to the AGW, so as to resend the accounting request message to the AGW in case that the accounting response message has not been received within the predefined time length.

3. The accounting method according to claim 1, wherein in case of receiving a packet data session release message from a data attachment point (DAP), the SRNC sends the session release message to the serving eBS, and initiates a UMB session release, so as to start an accounting flow.

4. The accounting method according to claim 3, wherein the accounting request message contains accounting stop information and an air interface record.

5. An accounting method for the ultra mobile broadband (UMB) access network, comprising following steps:
  a serving Evolved Base Station (eBS), which serves an Assess Terminal (AT), releasing resources allocated to the AT when the serving eBS sends a session release message to release a UMB session, or receives a session release message from a Session Reference Netwerl Controller (SRNC) to release a UMB session, and when there exist multiple Proxy Mobile IP (PMIP) tunnels
  the serving eBS sending an accounting request message concerning wireless resources occupied by the AT to an Access Gateway (AGW) serving the AT; and
  after receiving the accounting request message, the AGW sending an accounting response message to the serving eBS to confirm its reception of the accounting request message; wherein
  if there is an Air Link Record created for the AT in a non-serving eBS or DAP, the non-serving eBS sends an accounting request message to the AGW; and after receiving the accounting request message from the non-serving eBS, the AGW sends an accounting response message to the non-serving eBS so as to confirm its reception of the accounting request message from the non-serving eBS.

6. The accounting method according to claim 5, wherein, the serving eBS and non-serving eBS start timers of a predefined time length while sending the accounting request message to the AGW, so as to resend the accounting request message to the AGW in case that the accounting request message has not been received in the predefined time length.

7. The accounting method according to claim 5, wherein, upon receiving a packet data session release message from a data attachment point (DAP), the SRNC sends the session releasing message to the serving eBS and initiates the UMB session releasing, and thus starts an accounting flow.

8. The accounting method according to claim 7, wherein, the accounting request message sent by the non-serving eBS contains accounting stop information and an air interface record.

9. The accounting method according to claim 6, wherein, upon receiving a packet data session release message from a data attachment point (DAP), the SRNC sends the session releasing message to the serving eBS and initiates the UMB session releasing, and thus starts an accounting flow.

10. The accounting method according to claim 9, wherein the accounting request message contains accounting stop information and an air interface record.

11. The accounting method according to claim 2, wherein in case of receiving a packet data session release message from a data attachment point (DAP), the SRNC sends the session release message to the serving eBS, and initiates a UMB session release, so as to start an accounting flow.

12. The accounting method according to claim 11, wherein, the accounting request message sent by the non-serving eBS contains accounting stop information and an air interface record.

* * * * *